(12) United States Patent
Ehde et al.

(10) Patent No.: US 12,262,825 B2
(45) Date of Patent: *Apr. 1, 2025

(54) ADAPTABLE MULTI-USE MIRROR

(71) Applicants: Christopher Ehde, Chalfont, PA (US); Dana Ehde, Chalfont, PA (US)

(72) Inventors: Christopher Ehde, Chalfont, PA (US); Dana Ehde, Chalfont, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/394,695

(22) Filed: Dec. 22, 2023

(65) Prior Publication Data

US 2025/0072635 A1 Mar. 6, 2025

Related U.S. Application Data

(63) Continuation of application No. 18/242,178, filed on Sep. 5, 2023, now Pat. No. 11,910,941.

(51) Int. Cl.
| | | |
|---|---|---|
| A47G 1/02 | (2006.01) | |
| A47G 1/16 | (2006.01) | |
| A47G 1/17 | (2006.01) | |
| F21V 23/04 | (2006.01) | |
| F21V 33/00 | (2006.01) | |
| G09B 19/00 | (2006.01) | |

(52) U.S. Cl.
CPC ............ *A47G 1/02* (2013.01); *A47G 1/1613* (2013.01); *A47G 1/1653* (2013.01); *A47G 1/17* (2013.01); *F21V 23/0471* (2013.01); *F21V 33/004* (2013.01); *G09B 19/00* (2013.01); *A47G 2200/08* (2013.01)

(58) Field of Classification Search
CPC ...... A47G 1/02; A47G 1/1613; A47G 1/1652; A47G 1/17; F21V 33/004; F21V 23/0471; G09B 19/00
See application file for complete search history.

(56) References Cited

U.S. PATENT DOCUMENTS

| | | | | |
|---|---|---|---|---|
| 5,276,595 | A * | 1/1994 | Patrie | F21V 33/004 362/253 |
| 2004/0047052 | A1 * | 3/2004 | Zadro | A45D 42/16 248/467 |
| 2019/0239662 | A1 * | 8/2019 | Cole | G09B 19/0076 |
| 2019/0328161 | A1 * | 10/2019 | Wei | A47G 1/02 |

* cited by examiner

*Primary Examiner* — Thomas M Sember
(74) *Attorney, Agent, or Firm* — IP WORKS, PLLC (57) ABSTRACT

An adaptable multi-use mirror is shown and described. The adaptable multi-use mirror includes a puck. In one example the puck is comprised of a first part and a second part. The second part of the puck is removably secured to a toilet. The first part of the puck is removably secured to the second part via at least one magnet. A mirror is secured to the first part of the puck. In additional examples the adaptable multi-use mirror may include any number of lights, sensors, and attachment devices as desired.

16 Claims, 6 Drawing Sheets

ADAPTABLE MULTI-USE MIRROR

CROSS REFERENCE TO RELATED APPLICATIONS

This application claims the benefit of U.S. patent application Ser. No. 18/242,178 filed on Sep. 5, 2023. The above identified patent application is herein incorporated by reference in its entirety to provide continuity of disclosure.

BACKGROUND OF THE INVENTION

The present invention relates to an adaptable multi-use mirror. More particularly, the present invention provides a mirror which can be secured to various locations which allow a user to view their posterior. The adaptable multi-use mirror is designed to be a helpful tool to, at least in part, assist with potty training. The various features described herein solve many current issues that can arise from potty training. In addition the adaptable multi-use mirror is able to assist with other tasks necessary as one gets older.

When learning to use the bathroom part of the experience involves learning to properly clean oneself. It can be difficult for a one learning to use the bathroom, such as a little kid, to know if they have properly cleaned themselves. As such, it is common that a parent or other guardian will have to come and check to ensure that proper cleaning has been accomplished. Further, there is currently no good way for a trainee to properly check themselves.

In another instance, an individual may wish to perform personal grooming. It can be difficult to see certain personal areas. Currently, there is no good way to view these personal areas to ensure proper grooming. Without a proper vantage point, one may either miss areas or cut oneself.

In another instance seniors may need similar assistance to those first learning how to use the bathroom. It is common knowledge that as you get older your joints get stiffer and it may not be as easy to determine when personal areas are properly cleaned. This may result in the need of someone to check to make sure a proper cleaning has been completed. This can cause many issues such as the elderly individual needing to wait for a second party before leaving the bathroom, as well as added embarrassment.

In some instances, as one ages, they may get sores along their backside. These sores, or hemorrhoids, can be difficult to deal with. In some instances, these sores are medicated via a cream or other applicable substance. It can be extremely difficult to apply such a treatment if you cannot see the sores. This means that the medication may not be applied to the sores at all. Further, a person may need to have a second party to apply the medication which means they may have to wait.

Consequently, there is a need for an improvement in the art of groom equipment or potty-training mirrors. The present invention substantially diverges in design elements from the known art while at the same time solving a problem many people face when learning to properly clean or groom themselves after using the bathroom. In this regard the present invention substantially fulfills these needs.

SUMMARY OF THE INVENTION

The present invention provides an adaptable multi-use mirror wherein the same can be utilized for providing convenience for the user when learning to use the bathroom. When grooming oneself, of for applying medication. The adaptable multi-use mirror includes a puck. The puck has a first side and a second side. A mirror is secured to the first side of the puck. The puck is secured via the second side to an underside of a toilet lid.

Another object of the adaptable multi-use mirror is to have the puck have a first part and a second part. The first part of the puck may be removably secured to the second part of the puck.

Another object of the adaptable multi-use mirror is to have at least one magnet used to removably secure the first part of the puck to the second part of the puck. Another object of the adaptable multi-use mirror is to have a channel located on the second side of the puck. The channel is used to secure items therein.

Another object of the adaptable multi-use mirror is to have an adjustable bracket secured within the channel. The adjustable bracket is secured to the underside of the toilet lid.

Another object of the adaptable multi-use mirror is to have the puck be made at least in part from a silicon material.

Another object of the adaptable multi-use mirror is to have the mirror be removably secured to the first side of the puck.

Another object of the adaptable multi-use mirror is to have pipe clamp secured within the channel.

Another object of the adaptable multi-use mirror is to have the pipe clamp comprised of a first part and a second part. The first part is secured to the second part via a hinge.

Another object of the adaptable multi-use mirror is to have an adjustable positioning device secured within the channel at a first end.

Another object of the adaptable multi-use mirror is to have a pipe clamp secured to a second end of the adjustable positioning device.

Another object of the adaptable multi-use mirror is to have a pipe clamp be made of a first part and a second part. The first part is secured to the second part via a hinge.

Another object of the adaptable multi-use mirror is to have an adjustable positioning device secured at a first end to the second side of the puck and secured to a toilet at a second end of the adjustable positioning device.

Another object of the adaptable multi-use mirror is to have a chamber located within the first part of the puck. At least one light is secured about the mirror where the necessary components are to be located within the chamber.

Another object of the adaptable multi-use mirror is to have a power source operably coupled to a microprocessor located within the chamber. The power source and the microprocessor is operably couple to the at least one light.

Another object of the adaptable multi-use mirror is to have a laser secured to the first side. The laser is operably coupled to the power source and the microprocessor. The laser is configured to point into a toilet bowl.

Another object of the adaptable multi-use mirror is to have a motion sensor. The motion sensor is operably coupled to the at least one light. The motion sensor is configured to activate the at least one light.

Another object of the adaptable multi-use mirror is to have at least one speaker located about the mirror, wherein the at least one speaker is operably coupled to the microprocessor.

Another object of the adaptable multi-use mirror is to have at least one camera located about the mirror. The at least one camera is operably coupled to the microprocessor. The at least one camera is also operably coupled to a transceiver such that the video captured is able to be transmitted.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

LIST OF REFERENCE NUMERALS

With regard to the reference numerals used, the following numbering is used throughout the drawings.

| | |
|---|---|
| 100 | Adaptable multi-use mirror |
| 101 | puck |
| 101a | First part of the puck |
| 101b | Second part of the puck |
| 102 | Mirror |
| 103 | Frame |
| 201 | Magnets |
| 202 | Adhesive strip |
| 301 | Toilet lid |
| 401 | Channel |
| 402 | Pipe clamp |
| 402a | First part of the pipe clamp |
| 402b | Second part of the pipe clamp |
| 402c | Hinge |
| 402d | Screw |
| 403 | Friction increasing device |
| 404 | Adjustable positioning device |
| 601 | Laser pointer |
| 602 | Light |
| 603 | Motion sensor |
| 604 | Camera |
| 605 | Speaker |

DETAILED DESCRIPTION OF THE INVENTION

Reference is made herein to the attached drawings. Like reference numerals are used throughout the drawings to depict like or similar elements of the adaptable multi-use mirror. For the purposes of presenting a brief and clear description of the present invention, a preferred embodiment will be discussed as used for the adaptable multi-use mirror. The figures are intended for representative purposes only and should not be considered to be limiting in any respect.

Figure 1:
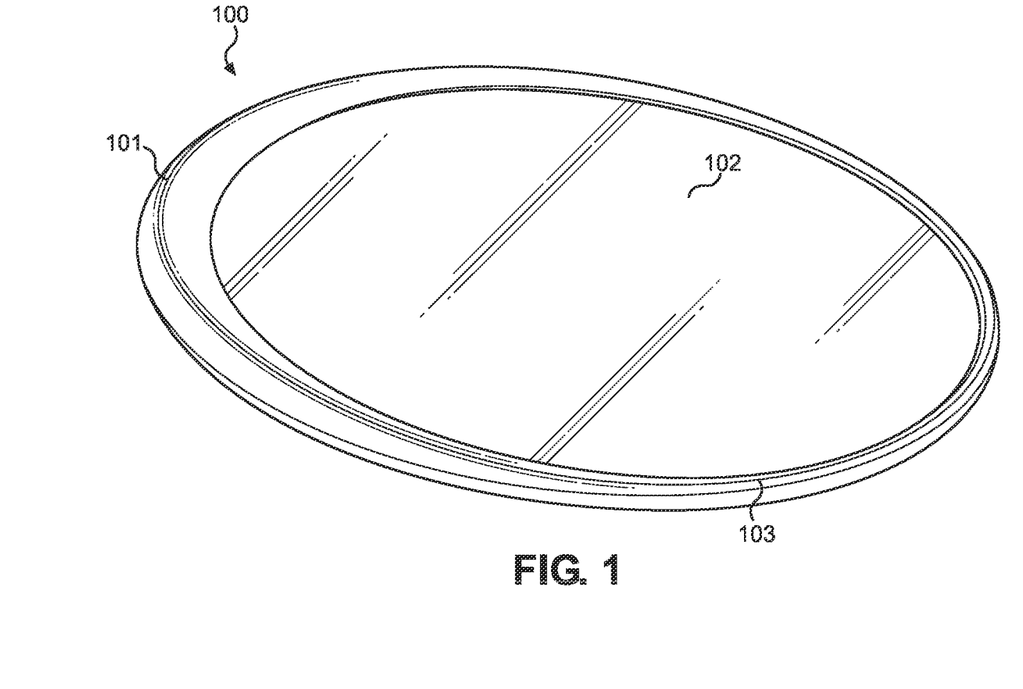
FIG. 1 shows a perspective view of one embodiment of the adaptable multi-use mirror.

Referring now to FIG. 1, there is shown a perspective view of one embodiment of the adaptable multi-use mirror. In the shown embodiment the adaptable multi-use mirror 100 is comprised of a puck 101. In one embodiment the puck 101 is a round shape. In another embodiment the puck 101 is an oval shape. In different embodiments the puck 101 is made from varying materials. In one embodiment the puck 101 is made from silicon. In another embodiment, the puck 101 may be made from a plastic silicon mix. However, given the nature of the intended use of the adaptable multi-use mirror 100 the puck 101 may be made from materials which are unlikely to rust or corrode. Further, the materials may be selected from those which are easy to clean.

The puck 101 includes an indent where a mirror 102 is placed. In one embodiment the mirror 102 covers an entire side of the puck 101. In another embodiment the indent is within the perimeter of the puck and therefore when the mirror 102 is placed therein the puck 101 will serve to create a frame 103 around the mirror 102.

In different embodiments the mirror 102 is made from different materials. The mirror 102 can be made of glass, metal, or other reflective materials. In one embodiment the mirror 102 is made from acrylic. In another embodiment the mirror 102 is made from polycarbonate. However, due to the nature of the intended use of the adaptable multi-use mirror 100 the mirror 102 is best constructed from materials which are unlikely to break and can be easily cleaned.

Figure 2:
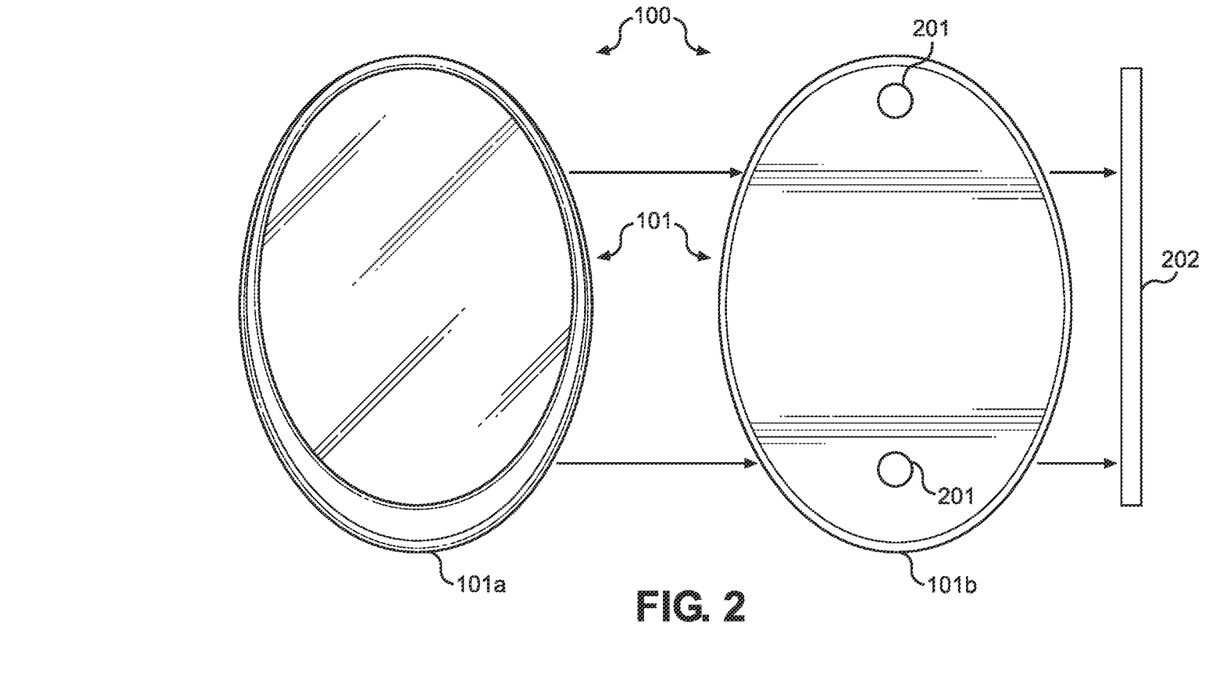
FIG. 2 shows an exploded view of one embodiment of the adaptable multi-use mirror.

Referring now to FIG. 2, there is shown an exploded view of one embodiment of the adaptable multi-use mirror. In one embodiment the adaptable multi-use mirror 100 is constructed in such a manner that it functions as one single piece. This means that multiple pieces may be secured together in a manner not meant to be separable.

In the shown embodiment the adaptable multi-use mirror 100 is constructed of materials in a manner that allows parts to be separable. In the shown embodiment the puck 101 is separable into a first part 101a and a second part 101b. The first part 101a and the second part 101b of the puck 101 are designed to be coupled together. In the shown embodiment magnets 201 are placed within each the first part 101a and the second part 101b. The magnets 201 will have opposite poles as necessary in order to attract each other. This will removably secure the first part 101a and the second part 101b together.

In the shown embodiment the mirror 102 is secured to one side of the first part 101a. This will allow for the mirror 102 to be removed for cleaning or other use without removing the entire puck 101. This is beneficial as in many embodiments the puck 101 is secured to a desired object using an adhesive strip 202. Adhesive strips 202 are seldom reusable and often difficult to remove in the first place. In many embodiments the adhesive strips 202 are double sided strips such that one side adheres to the puck 101 and the other to the desired object from which the adaptable multi-use mirror 100 is attached.

Figure 3:
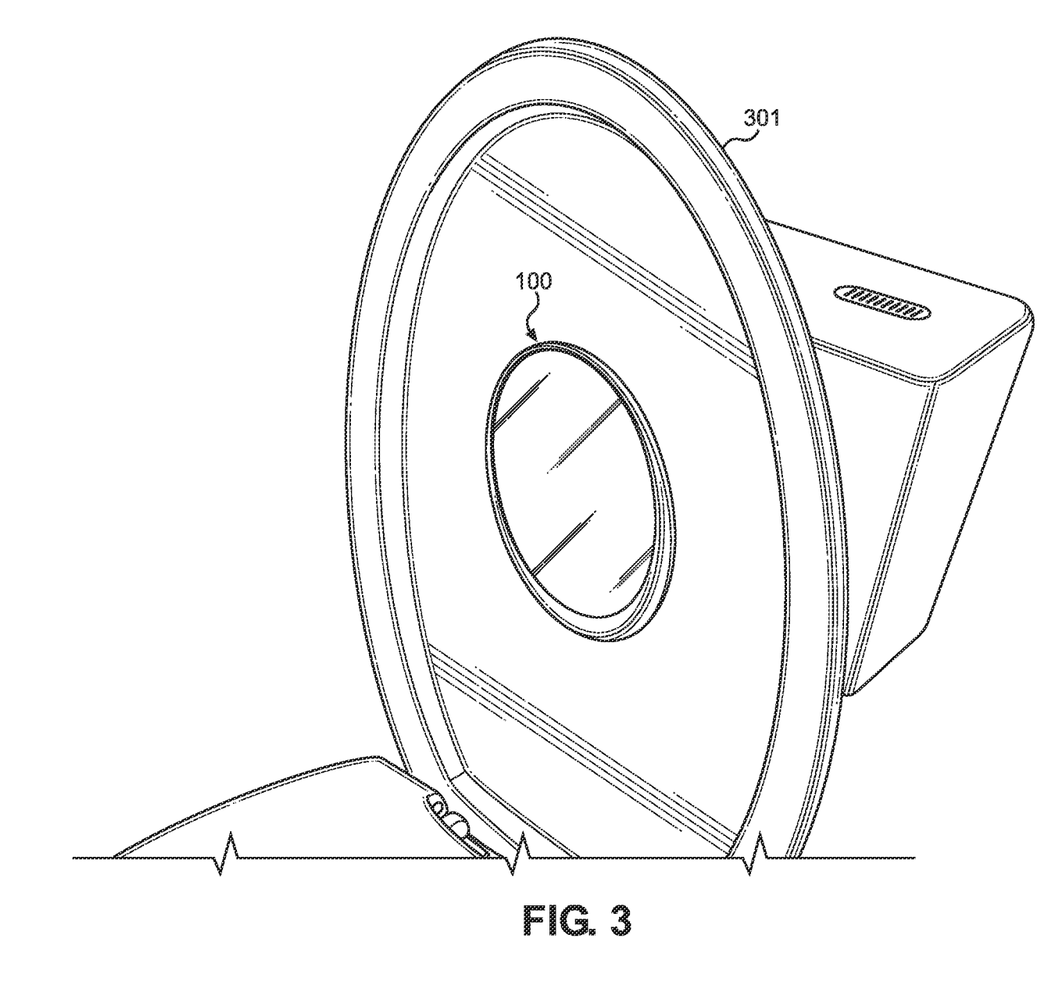
FIG. 3 shows a perspective view of one embodiment of the adaptable multi-use mirror attached to a toilet lid.

Referring now to FIG. 3, there is shown a perspective view of one embodiment of the adaptable multi-use mirror attached to a toilet lid. In the shown embodiment the adaptable multi-use mirror 100 is secured to the underside of a toilet lid 301. In this embodiment the adaptable multi-use mirror 100 will be in a perfect location to be used for one of its intended purposes. In different embodiments the adaptable multi-use mirror 100 may be placed in different locations. These locations will allow for the adaptable multi-use mirror 100 to be used in different ways and to provide a view of a desired part of a user's body.

In different embodiments the adaptable multi-use mirror 100 is secured to the toilet lid 301 in different ways. Each embodiment provides at least one benefit. In one embodiment the adaptable multi-use mirror 100 is secured to the toilet lid 301 via at least one magnet 201. By using magnets 201, the adaptable multi-use mirror 100 will be able to be removed for cleaning or other desired purposes. In another embodiment the adaptable multi-use mirror 100 is secured to the toilet lid 301 via a hook and loop fastener. This will also allow for the adaptable multi-use mirror 100 to be removable. In yet another embodiment the adaptable multi-use mirror 100 is secured to the toilet lid 301 via an adhesive material. This will ensure the adaptable multi-use mirror 100 will not fall from the toilet lid 301 when it is open and closed.

Figure 4:
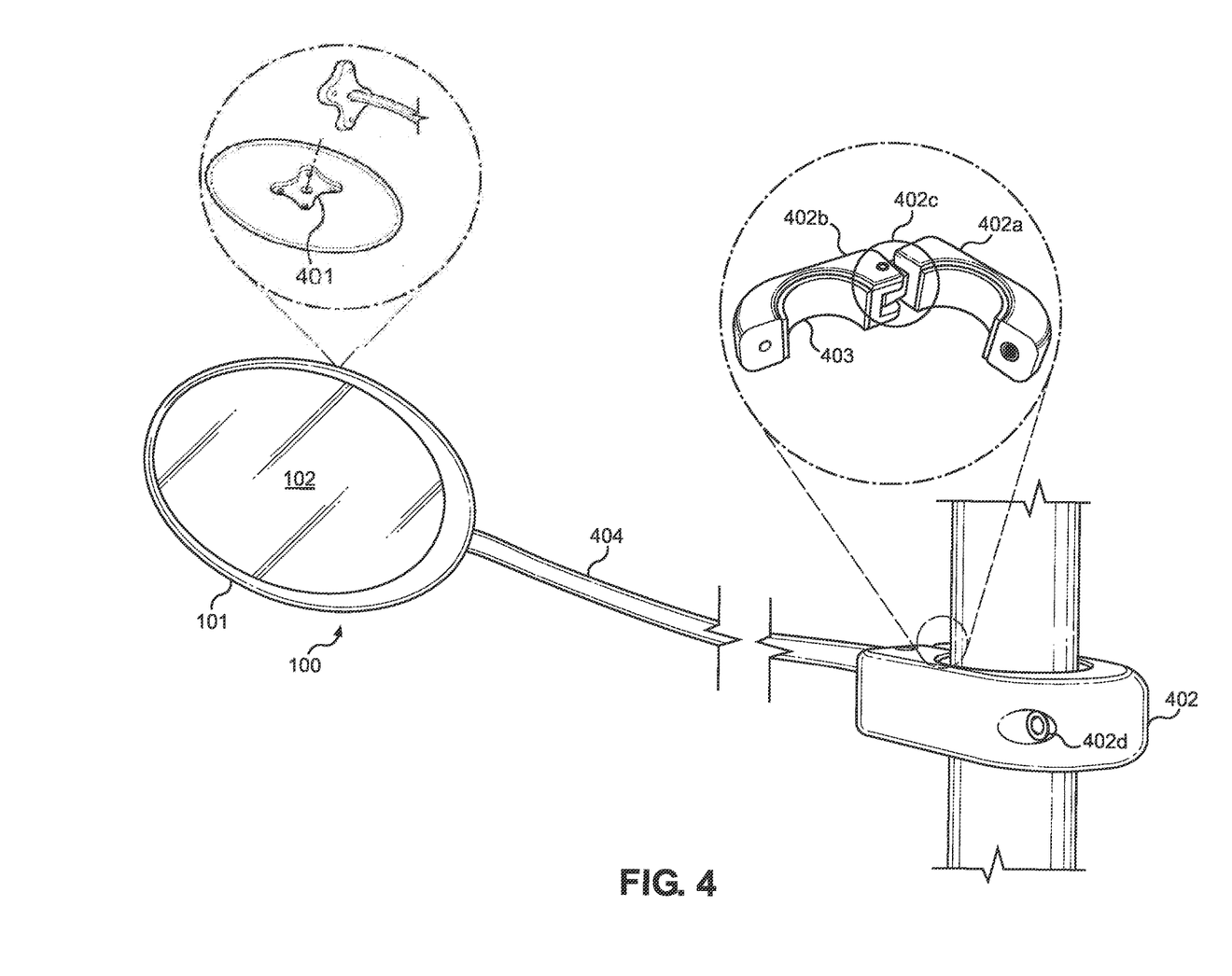
FIG. 4 shows a perspective view of one embodiment of the adaptable multi-use mirror having a pipe clamp attachment device.

Referring now to FIG. 4, there is shown a perspective view of one embodiment of the adaptable multi-use mirror having a pipe clamp attachment device. In some embodiments the adaptable multi-use mirror 100 is capable of being used in a multitude of locations and with various applications. In one embodiment there will be multiple second sides as described in the description of FIG. 2. In another embodiment the side of the puck 101 opposite the mirror 102 will have a channel 401 therein. The channel 401 will allow for different objects to be attached to the puck 101. For example, the puck 101 may be attached to a toilet, a tripod, a handle, or to another mounting bracket.

In one embodiment this can be used to apply an articulation feature to the adaptable multi-use mirror 100. In one embodiment the articulation feature will allow for the mirror 102 to be tilted while remaining secured to the desired device. In the shown embodiment a pipe clamp 402 is secured to the puck 101. The pipe clamp can be attached to various objects making the adaptable multi-use mirror 100 easier to use.

In one embodiment the pipe clamp 402 is made of a first part 402a and a second part 402b. In this embodiment the first part 402a and the second part 402b are secured together. In one embodiment the first part 402a and the second part 402b are secured together via a hinge 402c and a screw 402d. In another embodiment a plurality of screws 402d are used. In yet another embodiment the interior of the pipe clamp 402 includes a friction increasing device 403. The friction increasing device 403 may be made from foam or rubber. When secured to a desired object the friction increasing device 403 will better ensure that that pipe clamp 402 does not slide or move once secured.

In one embodiment the adaptable multi-use mirror 100 includes an adjustable positioning device 404. In the shown embodiment one end of the adjustable positioning device 404 is secured at one end to the pipe clamp 402 and to the channel 401 of the adaptable multi-use mirror 100 at a second end. The adjustable positioning device 404 is able to be bent into a desired position and can hold itself in that position. One example of such a device is commonly referred to as a goose neck.

Typically, public restroom toilets do not include toilet lids. The toilets do usually have water pipes which rise from the rear of the toilet to refill the bowl upon a flush. Therefore, there would be nowhere for a user to attach the adaptable multi-use mirror 100 to. However, in this embodiment the adaptable multi-use mirror 100 is secured to the toilet pipe in a public restroom. This will ensure that use of the adaptable multi-use mirror 100 is possible in many locations without toilet lids.

Figure 5:
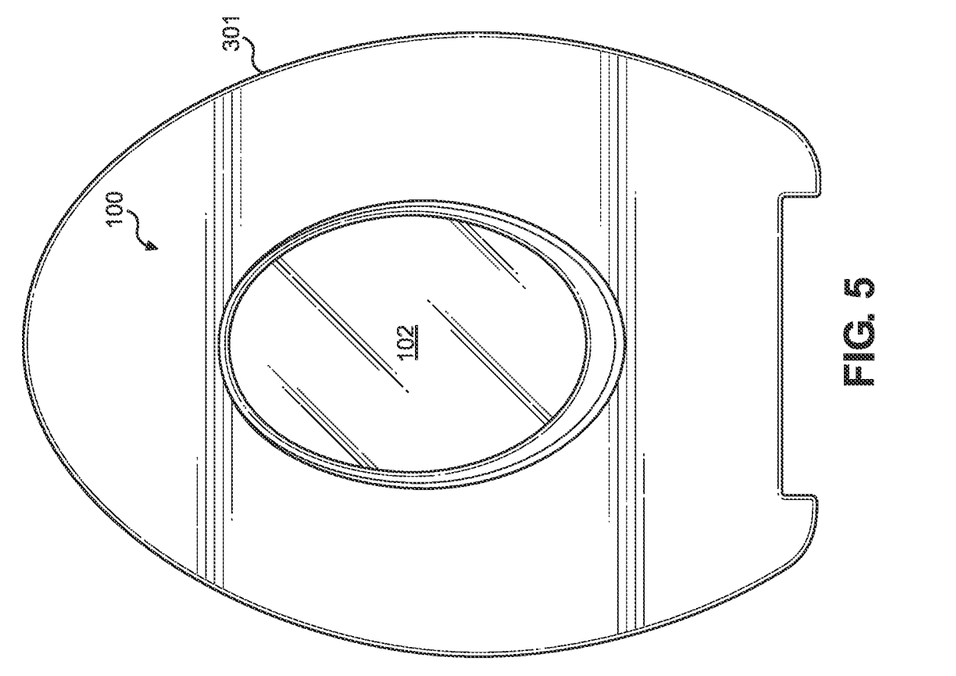
FIG. 5 shows a perspective view of one embodiment of the adaptable multi-use mirror integrated into a toilet lid.

Referring now to FIG. 5, there is shown a perspective view of one embodiment of the adaptable multi-use mirror integrated into a toilet lid. In one embodiment the adaptable multi-use mirror 100 is integral with a toilet lid 301. In this embodiment the mirror is attached directly to the underside of the toilet lid 301. In one embodiment the toilet lid 301 includes an indent specially formed to fit the mirror 102 within. In one embodiment the mirror 102 is flushed with the underside of the toilet seat.

Figure 6:
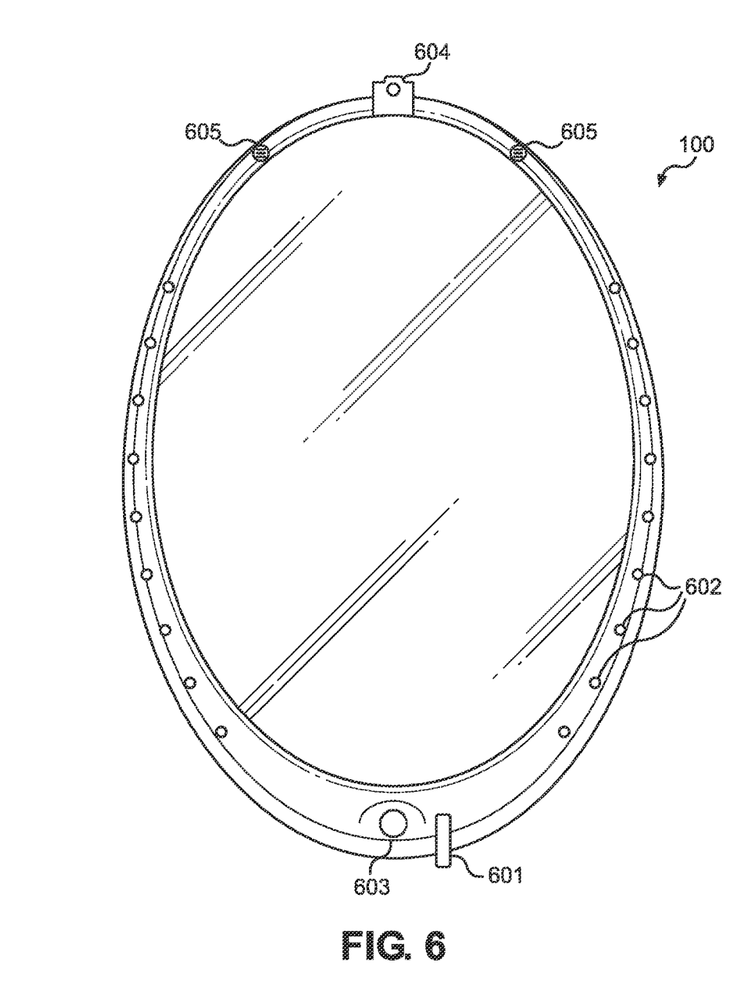
FIG. 6 shows a perspective view of an embodiment of the adaptable multi-use mirror with integrated lights and speakers.

Referring now to FIG. 6, there is shown a perspective view of an embodiment of the adaptable multi-use mirror with integrated lights and speakers. In one embodiment additional safety or training aids are included within the adaptable multi-use mirror 100. In one embodiment will have laser pointer 601. The laser pointer 601 will point into a toilet bowl and provide an aiming point for potty training. In another embodiment the adaptable multi-use mirror 100 includes at least one light 602. In one embodiment the at least one light 602 surrounds the mirror 102. In another embodiment the at least one light points down into the toilet bowl. In yet a further embodiment the laser 601 and/or at least one light 602 are activated via a motion sensor 603. This will allow for the features to be activated by lifting the lid or by the presence of a human.

In other embodiments the adaptable multi-use mirror 100 comes equipped with a camera 604. In one embodiment the camera 604 is operably coupled to a wireless transceiver such that it will be able to transmit photos or video. In yet another embodiment the adaptable multi-use mirror 100 includes at least one speaker 605. In one embodiment the at least one speaker 605 is operably coupled to a wireless transceiver such that audio may be sent or received.

In various embodiments the adaptable multi-use mirror 100 will include a housing which will allow for components to be placed inside. One of ordinary skill in the art will understand that for many of these features a compatible power source will need to be included and operably coupled to the objects. Further, one of ordinary skill in the art will understand that in order for some additonal features to work a CPU, microprocessor or other electrical components will be necessary. One of ordinary skill in the art will understand how to properly include and implement these elements within the housing.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. An adaptable multi-use mirror, the mirror comprises:
   a puck, wherein the puck has a first side and a second side with a channel located within the second side of the puck and a pipe clamp is secured within the channel;
   a mirror is secured to the first side of the puck;
   the puck is secured via the second side to an underside of a toilet lid.

2. The adaptable multi-use mirror of claim 1, further comprising a channel located on the second side of the puck, wherein the channel is used to secure items therein.

3. The adaptable multi-use mirror of claim 2, wherein
an adjustable bracket is secured therein;
the adjustable bracket is secured to the underside of the toilet lid.

4. The adaptable multi-use mirror of claim 1, wherein the puck is made at least in part from a silicon material.

5. The adaptable multi-use mirror of claim 1, wherein the mirror is removably secured to the first side of the puck.

6. The adaptable multi-use mirror of claim 1, wherein
the pipe clamp is comprised of a first part and a second part;
the first part is secured to the second part via a hinge.

7. The adaptable multi-use mirror of claim 6, further comprising an adjustable positioning device secured within the channel of the puck at a first end.

8. The adaptable multi-use mirror of claim 1, further comprising
magnets located on the second side of the of the puck;
a magnetic material secured to the toilet lid;
wherein the puck is secured to the toilet lid via the magnets and magnetic material.

9. An adaptable multi-use mirror, comprising,
a toilet lid having a first side and a second side, wherein the second side will face into a toilet bowl when the lid is in a closed position;
a mirror secured to the second side of the toilet lid
a puck having a first side and a second side with the mirror secured to the first side of the puck and the second side of the puck is secured to the second side of the toilet lid,
wherein magnets are used to removably secure the first part of the puck to the second part of the puck.

10. The adaptable multi-use mirror of claim 9, wherein the mirror is integrally connected to the second side of the toilet lid.

11. The adaptable multi-use mirror of claim 10, further comprising a power source operably coupled to a microprocessor located within the puck, wherein the power source and the microprocessor is operably coupled to at least one light.

12. The adaptable multi-use mirror of claim 11, further comprising a laser secured to the first side, wherein the laser is operably coupled to the power source and the microprocessor; and
wherein the laser is configured to point into a toilet bowl.

13. The adaptable multi-use mirror of claim 11, further comprising at least one speaker located about the mirror, wherein the at least one speaker is operably coupled to the microprocessor.

14. The adaptable multi-use mirror of claim 11, further comprising
at least one camera located about the mirror, wherein the at least one camera is operably coupled to the microprocessor,
the at least one camera is operably coupled to a transceiver such that the video captured is able to be transmitted.

15. The adaptable multi-use mirror of claim 9, further comprising
a puck having a first side and a second side;
the mirror is secured to the first side of the puck;
the second side of the puck is secured to the second side of the toilet lid.

16. The adaptable multi-use mirror of claim 15, wherein the puck is removably secured to the toilet lid.

* * * * *